United States Patent [19]

Walker

[11] 4,212,428
[45] Jul. 15, 1980

[54] HYDRAULIC POWER AND CONTROL SYSTEM FOR GRANULAR FERTILIZER SPREADERS

[75] Inventor: John H. Walker, Beatrice, Nebr.

[73] Assignee: Dempster Industries, Inc., Beatrice, Nebr.

[21] Appl. No.: 893,801

[22] Filed: Apr. 5, 1978

[51] Int. Cl.² ............................................. E01C 19/20
[52] U.S. Cl. ..................................... 239/677; 222/63; 222/622; 239/156
[58] Field of Search ............... 222/614, 615, 621, 622, 222/334, 63; 239/156, 157, 677; 198/310

[56] References Cited
U.S. PATENT DOCUMENTS

| | | | |
|---|---|---|---|
| 3,344,993 | 10/1967 | Wilder et al. | 239/684 |
| 3,401,890 | 9/1968 | Middlesworth | 239/677 X |
| 3,429,418 | 2/1969 | Fyrk | 239/677 X |
| 3,511,411 | 5/1970 | Weiss | 222/614 X |
| 3,550,866 | 12/1970 | Swenson | 239/677 |
| 3,776,431 | 12/1973 | Riley | 239/677 X |
| 4,098,433 | 7/1978 | Oligschlaeger | 239/677 X |

FOREIGN PATENT DOCUMENTS 2039483  2/1972  Fed. Rep. of Germany ........... 239/677

Primary Examiner—Stanley H. Tollberg
Assistant Examiner—Fred A. Silverberg
Attorney, Agent, or Firm—Schmidt, Johnson, Hovey & Williams

[57] ABSTRACT

A trailer-type vehicle for transporting and dispensing solid materials over the ground includes a self-contained, hydraulic power and control system driven by one of the vehicle's ground engaging wheels which operates a first dispensing mechanism at a selectable speed proportional to the vehicle's rate of travel over the ground, but operates a second dispensing mechanism at a constant speed regardless of the vehicle's rate of travel. A single hydraulic motor driven by a selectively engageable drive train connected with one of the vehicle's wheels is novelly employed as a hydraulic pump for delivering a force transmitting fluid through a pair of control valves to a pair of hydraulic motors respectively powering the dispensing mechanisms. One of the control valves includes provision for selectively adjusting the flow rate to the associated hydraulic motor thereby allowing adjustment of the volume of material being dispensed per area of ground covered by the vehicle.

4 Claims, 4 Drawing Figures

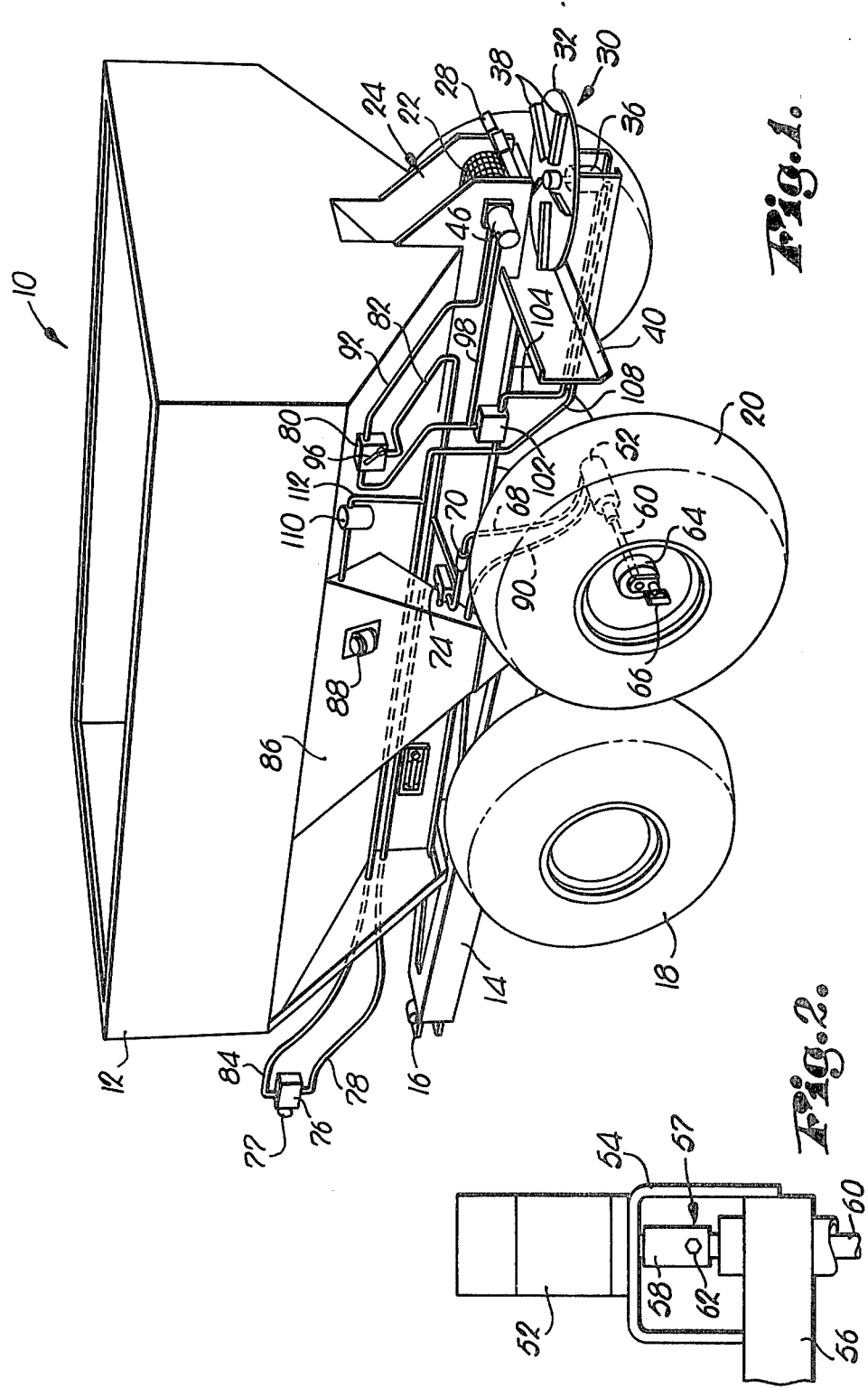

HYDRAULIC POWER AND CONTROL SYSTEM FOR GRANULAR FERTILIZER SPREADERS

BACKGROUND OF THE INVENTION

1. Field of the Invention

This invention deals with vehicles for transporting and dispensing solid materials such as fertilizers or the like over the ground, and deals more particularly with a hydraulic system driven by one of the vehicle's ground engaging wheels for independently driving and controlling the operation of a pair of material handling and dispensing mechanisms at different rates of speed.

2. Description of the Prior Art

One common form of a solid material dispensing vehicle adapted to be towed by a towing vehicle includes a material hopper provided with a conveyor belt therebeneath for carrying material to a discharge area where a rotating spreader fan scatters the material over the ground as the vehicle travels over the ground. The conveyor is normally powered by means of a mechanical drive train connected with one of the vehicle's ground engaging wheels which results in conveyor movement that is directly proportional to the rotational speed of the driving wheel and is therefore also directly proportional to the vehicle's speed over the ground. A proportional relationship between conveyor movement and the vehicle's speed results in dispensing material from the vehicle at a rate of application which is constant regardless of variation of the vehicle's speed. The specific rate of material dispensing is determined by the selection of particular gear ratios in the drive train and is further determined by the position of a manually adjustable gate structure adjacent the discharge area which varies the size of a discharge opening in the latter, thereby determining the rate at which the conveyor dispenses material through the discharge opening.

Normally, it is desirable to maintain the spreader fan at a constant rotational speed in order to dispense the material in a uniform pattern across a constant width of the ground, regardless of the vehicle's speed. In the past, any of several approaches have been taken to provide constant rotational speed of the spreader fan: a power takeoff shaft or other constant speed power shaft driven by the towing vehicle may be connected to the dispensing vehicle in order to provide a constant drive speed to the spreader fan; a constant speed gasoline engine may be mounted directly on the dispensing vehicle, or the towing vehicle may be adapted to provide a source of constant flow hydraulic power which is hydraulically coupled to the dispensing vehicle, and more particularly to a hydraulic motor for driving the spreader fan at a constant speed. A less desirable approach to the problem involves driving the spreader fan by means of a mechanical drive train connected to one of the vehicle's ground engaging wheels; however, this driving configuration requires that the dispensing vehicle be towed at a single, specific speed in order to accomplish proper rotational speed of the spreader fan.

From the foregoing, it is apparent that separate sources of power have previously been needed to drive the conveyor and spreader fan at different respective rates, and in most cases a drive train coupling was required between the dispensing vehicle and the towing vehicle while considerable gear mechanism was needed to obtain the desired drive ratios. Thus, there is a need in the art for a single, self-contained, power and control system for driving both the conveyor and spreader fan at different respective rates of speed which eliminates the need for separate power drive mechanisms associated with the conveyor and spreader fan, and further eliminates the need for a drive train coupling between the towing vehicle and dispensing vehicle.

SUMMARY OF THE INVENTION

The present invention provides a power and control system carried entirely by the dispensing vehicle which drives both the conveyor and spreader fan at different respective rates of speed, using a single source of power. A hydraulic motor is novelly employed for pumping a force transmitting fluid under pressure and is driven by a selectively engageable drive train connected with one of the dispensing vehicle's ground engaging wheels. The conveyor and spreader fan are driven by hydraulic motors which are hydraulically coupled through a pair of respectively associated, specially adapted hydraulic valve devices, to the wheel driven, hydraulic pump whose fluid output is delivered to the valve devices at a rate proportional to the rotation of the ground engaging driving wheel, which is in turn proportional to the vehicle's speed over the ground. One of the valve devices coupled between the conveyor motor and the hydraulic pump includes a means for regulating the quantity of fluid flow to the conveyor motor, thereby allowing adjustment of the speed of the conveyor which eliminates the need for the provision of a mechanically adjustable gate structure for varying the size of the discharge opening. The second valve device receives hydraulic fluid from the first valve device and conveyor motor at a flow rate proportional to the vehicle's speed over the ground, and functions to divide such flow into a first flow stream having a constant flow rate, regardless of the speed of the vehicle, which is delivered to the spreader fan motor thereby driving the latter at a constant speed, and a second flow stream which is diverted away from the spreader fan motor and is returned to the hydraulic system. A flow control device is provided to limit the fluid flow delivered to the system by the hydraulic pump, and a relief valve is provided to relieve the system of excessive pressure build-up in the event of a hydraulic malfunction.

BRIEF DESCRIPTION OF THE DRAWINGS

In the drawings:

FIG. 1 is a perspective view of a vehicle for dispensing solid materials having a hydraulic power and control system for driving the conveyor and spreader fan, which forms the currently preferred form of the invention;

FIG. 2 is a fragmentary view of a portion of a wheel frame of the vehicle shown in FIG. 1, showing a force limiting coupling between a wheel shaft and the hydraulic pump;

DISCLOSURE OF THE PREFERRED EMBODIMENT

Figure 3:
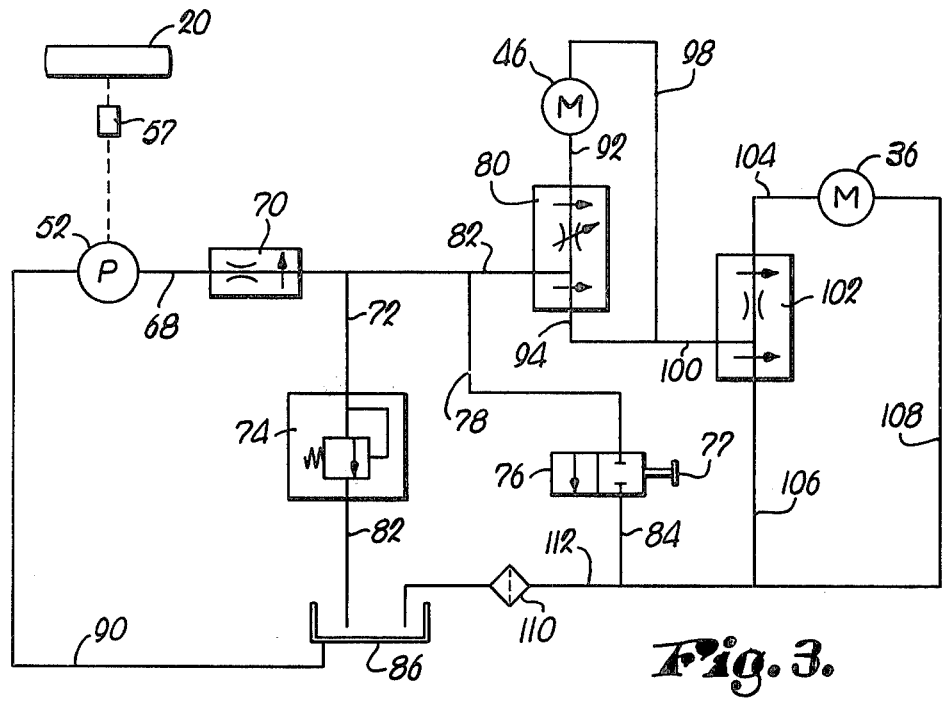
FIG. 3 is a combined diagrammatic and schematic representation of the hydraulic power and control system; and, FIG. 4 is a fragmentary, longitudinal sectional view of rearward portions of the vehicle shown in FIG. 1, depicting the operative relationship between the conveyor and spreader fan.
Figure 4:
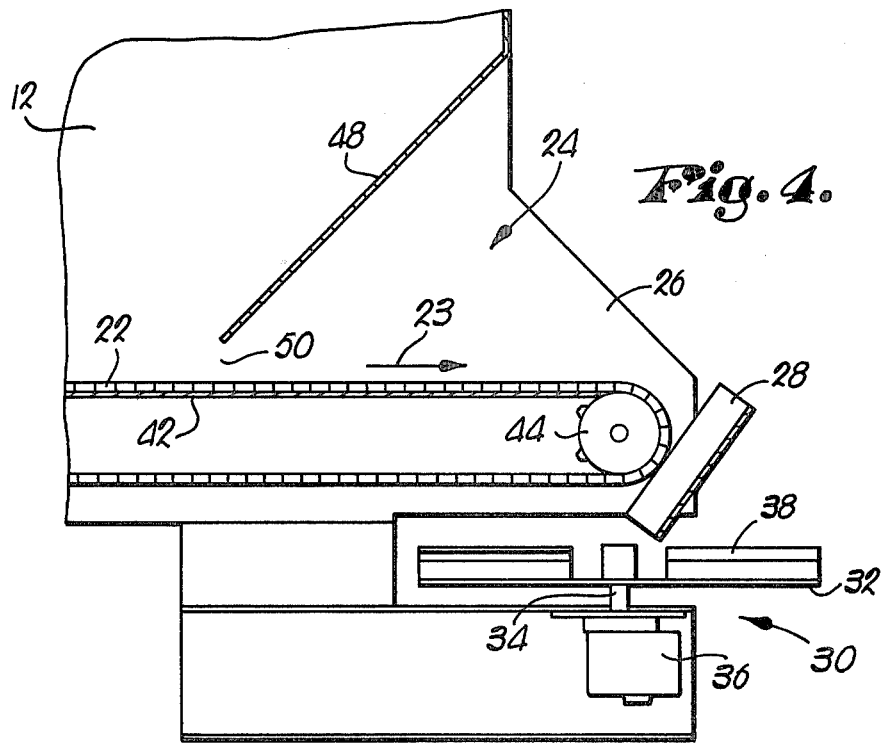

Referring now to the drawings, a vehicle 10 for transporting, dispensing and spreading solid materials over the ground includes hopper structure 12 suitably secured to, and carried by a supporting frame 14 provided with hitch means 16 adapted to be coupled with a prime mover (not shown) to allow towing of the vehicle 10 therebehind. Wheel means including longitudinally spaced wheel members 18 and 20 are mounted on the support frame 14 on each side of the latter by means of a suitable suspension structure to support the vehicle 10 for travel over the ground.

The hopper 12 is provided with a front-to-rear moving, endless conveyor belt 22 therebeneath for moving solid materials within the hopper 12 toward a discharge area 24 near the rear of the vehicle 10. A pair of vertical sidewalls 26 on opposite lateral sides of the conveyor belt 22 adjacent the discharge area 24 guide the flow of material on conveyor belt 22 onto an inclined material chute 28 which in turn directs the dispensed material onto a spreader fan generally indicated by the numeral 30. Spreader fan 30 comprises a horizontally disposed, circular plate 32 vertically aligned beneath the material chute 28 and securely mounted to the shaft 34 of a hydraulic motor 36 for rotation by the latter. A plurality of circumferentially spaced, radially extending vane elements 38 are suitably secured to the upper surface of the plate 32, and a transversely extending deflector plate 40 is suitably attached to the hopper structure 12 adjacent the spreader fan 30 and spaced slightly in front of the latter. Conveyor belt 22 is supported by a stationary bottom member 42, and is trained around a rotatably mounted toothed pulley 44 driven to rotate by a hydraulic motor 46 suitably mounted in one of the vertical sidewalls 26. The hopper structure 12 includes inclined, stationary rearwall 48 having the lower extremity thereof elevationally spaced a prescribed distance from the conveyor belt 22 to define a discharge opening 50 adjacent the discharge area 24.

A hydraulic pump 52 is suitably mounted by means of a U-shaped bracket 54 to a suspension frame member 56 carrying one of the wheel members 20. Hydraulic pump 52 may comprise a hydraulic motor preferably of the gerotor/geroller type construction such as that manufactured by the Char-Lynn Company and identified by the manufactures designation of series 2000. A mechanical input drive shaft of the pump 52 is drivingly coupled to the wheel member 20 through a force limiting device 57 comprising a sleeve member 58 and a shear bolt 62. The input drive shaft of the pump 52 is secured by a key and keyways (not visible) and a bolt (not visible) to one end of the sleeve member 58, while a takeoff drive shaft 60 driven by the wheel member 20 is connected to the other end of sleeve member 58 by means of the shear bolt 62. Takeoff shaft 60 is releasably coupled to the hub 64 of the wheel member 20 and may be selectively disengaged from the hub 64 by means of a twistable handle assembly 66.

Pump 52 has the hydraulic output section thereof operably coupled by hydraulic line 68 to the input of a ordinary flow control device 70, such as a flow control valve manufactured by Brand Hydraulics, Inc. of Omaha, Nebraska and identified by the manufacturer's No. CF-50. The output section of the flow control device 70 is operably coupled by hydraulic line 72 to the input of a pressure relief valve 74, to the input of an off/on control 76 via hydraulic line 78, and finally, to the input of a rate control valve 80 by hydraulic line 82. The hydraulic output sections of relief valve 74 and on/off control 76 designated by the hydraulic lines 82 and 84 respectively, are in fluid communication with a reservoir tank 86 adapted to hold a quantity of hydraulic fluid. Reservoir 86 is mounted on the support frame 14 adjacent the hopper structure 12 and is provided with an access opening defined by the filler cap 88. Reservoir 86 is coupled by hydraulic line 90 to the hydraulic input section of the pump 52 and a hydraulic fluid filter device 110 of the conventional type is coupled between line 112 and the reservoir 86.

Rate control valve 80 is a commercially available device such as that manufactured by Brand Hydraulics Inc. and identifed by the manufacturer's No. FC-51, and includes a controlled flow output section coupled with the hydraulic line 92 and a bypass output section coupled with the hydraulic line 94. Valve 80 is a full range pressure compensating, variable flow type control valve and includes a rotatable volume lever 96 which controls the volume flow through the controlled output section coupled with line 92 to a preselected level, which is proportional to the flow through the input section thereof on line 82, while the bypass output section diverts a portion of the fluid flow in excess of the preselected lever thereof on line 94. The hydraulic motor 46 has the hydraulic input thereof operably coupled with hydraulic line 92, while the hydraulic output of motor 46 is coupled by hydraulic line 98 to hydraulic line 94 as well as to hydraulic line 100 which is operably coupled with the hydraulic input section of a constant volume priority divider 102. Divider 102 is a commercially available device such as that manufactured by Brand Hydraulics Inc. and identified by the manufacturer's identification No. of FG-51. Divider 102 divides the fluid flow received on line 100 into a first output stream on hydraulic line 104 having a constant flow rate regardless of variations in the flow rate on line 100 as long as the flow rate on line 100 exceeds a prescribed minimum flow rate, and provides a bypass flow stream on output line 106 which consists of fluid flow in excess of the constant flow rate output on line 104. Line 104 is hydraulically coupled to the hydraulic input of hydraulic motor 36, the hydraulic output of the latter being coupled via hydraulic line 108 to line 106 and through the hydraulic fluid filter 110 to the reservoir 86.

Turning attention now to the operation of the vehicle 10, let it first be assumed that the twistable handle assembly 66 is manually positioned to engage the hub 64 with the takeoff drive shaft 60 so that the latter rotates along with the wheel member 20, and let it further be assumed that a manually actuatable portion 77 of the off/on control 76 has been actuated to an on position by an operator of the towing vehicle (not shown). Under these conditions, the wheel member 20 drives the hub 64 along with the shaft 60 to power the pump 52 which delivers hydraulic fluid via line 68 at a rate directly proportional to the rotational speed of the wheel member 20, and thus, in proportion to the speed of the vehicle 10 over the ground. The fluid control device 70 allows free, unrestricted flow of the fluid therethrough on line 68 when the fluid flow produced by the pump 52 remains below a maximum preselected value. However, in the event that the rotation of shaft 60 exceeds a maximum rate, which may result in cavitation of the pump 52 and attendant damage to the latter, the flow control device 70 functions to restrict the flow of fluid therethrough in response to the excessive fluid pressure output of the pump 52, and in response to the restriction imposed on the pump output, excessive input torque is transferred from the pump 52 to the shaft 60 which results in the shearing of the shear bolt 62, thereby uncoupling the pump 52 from the rotating hub 64 and preventing damage of the pump 52.

Assuming now that pump 52 is operating normally to deliver fluid via line 68 through the flow control device 70 such that the latter allows unrestricted flow therethrough, and further assuming that the off/on control 76 is positioned in the on position as depicted in FIG. 3 whereby to prevent fluid flow from line 78 to line 84, fluid is delivered from the output of the device 70 to the input of the pressure relief valve 74 by line 72 as well as to the input section of the rate control valve 80 by line 82. Pressure relief valve 74 functions as a safety device which protects the hydraulic system from overpressure conditions resulting from excessive driving of the pump 52 or other hydraulic component malfunctions, and normally prevents the flow of fluid from line 72 to line 82 when the fluid pressure at the input section thereof on line 72 is below a preset value. As indicated previously, the rate of fluid flow on line 82 is directly proportional to the rotational speed of the shaft 60. The rate control valve 80 functions to deliver a selectable portion of the fluid flowing in line 82 to the hydraulic input of motor 46 via line 92, while the quantity of fluid in excess of the selected portion is bypassed on line 94. Thus, the hydraulic motor 46 rotates the pulley 44 to move the conveyor belt 22 at a speed which is directly proportional to the rotational speed of wheel member 20, and is therefore also proportional to the speed of the vehicle 10. However, by virtue of the provision of the volume lever 96, the volume of fluid delivered on line 92 to the input of motor 46 may be adjusted thereby varying the speed of the conveyor 22 to allow alteration of the ratio between the speed of the conveyor 22 and the speed of the vehicle 10; by this feature, the quantity of material dispensed by the vehicle 10 in relation to the ground area covered by the latter may be simply and rapidly varied, even though the area of the discharge opening 50 remains constant. Fluid exiting from the output section of the motor 46 on line 98 rejoins the excess portion of the fluid on line 94 and is delivered, at a rate proportional to the output of pump 52, on line 100 to the input section of the constant volume priority divider 102. Divider 102 functions to divide the proportional fluid flow on line 100 into a first flow stream having a constant rate of flow on line 104, regardless of variations in the flow rate on line 100, and a second flow stream on line 106 which comprises that portion of the fluid flow in line 100 which exceeds the constant flow rate output on line 104. Thus, a constant volume of fluid is delivered on line 104 to the input of hydraulic motor 36 which operates the latter to drive the spreader fan 30 at a constant rate of speed, regardless of the speed of the vehicle 10 when the latter is moving. The hydraulic output of motor 36 on line 108 is combined with the excess fluid flow on line 106 and is delivered via line 112 through the fluid filter 110, thence into the fluid reservoir 86. The pump 52 receives hydraulic fluid at the input thereof on line 90 from the fluid reservoir 86.

With motors 36 and 46 powered by the single, hydraulic pump 52 to drive the spreader fan 30 and conveyor belt 22, material within the hopper 12 is moved along the conveyor belt 22 in the direction of the arrow 23 through the discharge opening 50 and is dumped onto inclined surface areas of the material chute 28, which directs the material being dispensed onto the spinning circular plate 32 and vane elements 38. The rotating spreader fan 30 functions to spread the material evenly to the sides and rear of the vehicle 10, while the deflector plate 40 prevents forward dispensing of the material. The operator of a towing vehicle (not shown) may discontinue the dispensing operation while the vehicle 10 is moving by merely deactuating the portion 77 of the off/on control 76 which completes a flow path from line 78 to line 84, thereby diverting the output of pump 52 on line 68 to line 112 back to the reservoir 86, and bypassing the valve 80 and divider 102. Similarly, in the event that excessive fluid pressure exists in the hydraulic system, excessive fluid pressure in line 72 actuates the pressure relief valve 74 to connect line 82 with the output of pump 52 on line 68 thereby diverting the fluid flow from valve 80 and divider 102 to deenergize motors 36 and 46.

From the foregoing, it is apparent that the present invention provides a hydraulic power and control system for controlling and driving a pair of dispensing mechanisms which eliminates the need for multiple mechanical drive trains and gearing heretofore required for powering the dispensing mechanisms. By the provision of the rate control valve 80, along with a fixed discharge opening 50, the rate at which material is dispensed from the hopper 12 at any given speed of the vehicle 10 may be easily adjusted, without the need for multiple ratio mechanical drive systems for the conveyor 22 or an adjustable gate for varying the area of the discharge opening 50. Moreover, constant rotational speed of the spreader fan 30 is accomplished without the need for external power sources such as the power takeoff shaft from a towing vehicle, but yet eliminates the safety hazard presented by prior art machines which continue the rotation of the spreader fan 30 when the towing vehicle stops. Finally, it is particularly important to note that the conveyor 22 and spreader fan 30 are driven by a single ground engaging wheel of the vehicle 10 in conjunction with a single hydraulic pumping means.

INDUSTRIAL APPLICABILITY

The foregoing description of the invention amply illustrates the construction and method of use of the hydraulic power and control system. It is to be noted that other force limiting means such as a clutch mechanism may be employed in lieu of the shear bolts suggested by the foregoing description for preventing damage to the pump 52. It is to be understood that the hydraulic power and control system may be used with other mobile dispensing apparatus having a pair of dispensing mechanism operable at different rates of speed in relation to the speed of the vehicle.

From the foregoing, it is clear that the invention provides especially simple means for driving a pair of material dispensing mechanisms from a ground engaging wheel of a material dispensing vehicle. It will be observed that the improved apparatus not only provides for the reliable accomplishment of the invention, but does so in a particularly simple and economical manner. It is recognized, of course, that those skilled in the art may make various modifications or additions to the currently preferred embodiment chosen to illustrate the invention without departing from the gist and essence of the present contribution to the art. Accordingly, it is to be understood that the protection sought and to be afforded hereby should be deemed to extend to the subject matter claimed and all equivalents thereof fairly within the scope of the invention.

I claim:

1. In apparatus for spreading material such as fertilizer:

a mobile vehicle adapted to be towed during material spreading operation thereof, said vehicle having a material carrying hopper and ground engaging wheel means adapted to be turned in response to movement of said vehicle and at a rate substantially proportional to the speed of said movement of said vehicle;

conveyor means carried by said vehicle, operably associated with said hopper and having a rotatable operating part to be driven for operating said conveyor means to remove material from said hopper at a rate substantially proportional to the speed of rotation of said operating part;

rotatable spreader means carried by said vehicle, operably associated with said conveyor means for receiving material being removed from said hopper by said conveyor means, and operable when rotatively driven for spreading said material received from said conveyor means over a zone of the ground adjacent the vehicle and of extent dependent upon the rate at which said spreader means is rotated;

a first, hydraulic motor having an inlet port and an outlet port and operably coupled with said operating part of said conveyor means for driving the latter at a speed substantially proportional to the rate of flow of hydraulic fluid applied to said inlet port of said first motor;

a second, hydraulic motor having an inlet port and an outlet port and operably coupled with said spreader means for driving the latter at a speed substantially proportional to the rate of flow of hydraulic fluid applied to said inlet port of said second motor;

hydraulic rate control valve means having an inlet port, a controlled flow outlet port and a bypass flow outlet port, said control valve means delivering at said controlled flow outlet port thereof a flow of hydraulic fluid substantially proportional to the flow of hydraulic fluid applied to said inlet port thereof and delivering at said bypass flow outlet port thereof the remainder of said hydraulic fluid applied to said inlet port thereof;

hydraulic flow driver means having an inlet port, a controlled flow outlet port and a bypass flow outlet port, said divider means delivering at said controlled flow outlet port thereof a substantially constant flow of hydraulic fluid and delivering at said bypass flow outlet port thereof the remainder of said hydraulic fluid applied to said inlet port thereof;

a hydraulic pump adapted to be rotatively driven, said pump having an inlet port and an outlet port and being operable to deliver at said outlet port thereof a flow of hydraulic fluid substantially proportional to the rate at which said pump is driven;

means for operably coupling said pump with said wheel means for driving said pump at a rate substantially proportional to the speed of said movement of said vehicle in response to turning of said wheel means; and hydraulic fluid circuit means including a portion coupling the outlet port of said pump with the inlet port of said control valve means, a portion coupling the controlled flow outlet port of said control valve means with the inlet port of said first motor, portions coupling the outlet port of said first motor and the bypass flow outlet port of said control valve means with the inlet port of said divider means, a portion coupling the controlled flow outlet port of said divider means with the inlet port of said second motor, and return portions coupling said outlet port of said second motor and said bypass flow outlet port of said divider means with said inlet port of said pump, whereby said conveyor means is driven at a rate substantially proportional to the speed of movement of said vehicle, while said spreader means is driven at a substantially constant rate, for spreading said material substantially uniformly upon said zone of the ground regardless of variations in the speed at which said vehicle is being moved.

2. Apparatus as set forth in claim 1, wherein:

said rate control valve means includes means for selectively adjusting the ratio between the flow of hydraulic fluid applied to said inlet port thereof and the flow of hydraulic fluid delivered at said controlled flow outlet port thereof.

3. Apparatus as set forth in claim 1, wherein:

said apparatus includes only a single hydraulic pump as aforesaid.

4. Apparatus as set forth in claim 3, wherein:

said pump is of the constant displacement type.

* * * * *